(12) United States Patent
Dixon

(10) Patent No.: US 9,169,790 B2
(45) Date of Patent: Oct. 27, 2015

(54) METHOD FOR CONTROLLING THE OPERATION OF A COMPRESSOR

(75) Inventor: Jon Dixon, Maldon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 13/370,199

(22) Filed: Feb. 9, 2012

(65) Prior Publication Data

US 2012/0204560 A1 Aug. 16, 2012

(30) Foreign Application Priority Data

Feb. 10, 2011 (GB) .................................. 1102342.1

(51) Int. Cl.
| | |
|---|---|
| *F02B 33/44* | (2006.01) |
| *F02B 33/00* | (2006.01) |
| *F02D 23/00* | (2006.01) |
| *F02B 37/16* | (2006.01) |

(Continued)

(52) U.S. Cl.
CPC ............... *F02D 23/00* (2013.01); *F02B 37/16* (2013.01); *F02B 39/16* (2013.01); *F02D 41/0007* (2013.01); *F02B 2039/164* (2013.01); *F02D 41/1446* (2013.01); *F02D 41/1447* (2013.01); *F02D 2009/0225* (2013.01); *F02D 2200/04* (2013.01); *F02D 2200/0402* (2013.01); *F02D 2200/0414* (2013.01); *F02D 2700/0256* (2013.01); *F05B 2220/40* (2013.01); *Y02T 10/144* (2013.01)

(58) Field of Classification Search
CPC .......... F02B 37/16; F02B 39/16; F02D 23/00; F02D 41/0007; F02D 2009/0225; F02D 2700/0256; F02D 2200/0402; F02D 2200/0414; F02C 6/12; F02C 23/00; F05B 2220/40
USPC .................................. 60/605.1, 611; 123/564
See application file for complete search history.

(56) References Cited

U.S. PATENT DOCUMENTS

| | | | |
|---|---|---|---|
| 6,401,457 B1 | 6/2002 | Wang et al. | |
| 6,457,466 B1 * | 10/2002 | Ritter et al. | .................... 123/676 |

(Continued)

FOREIGN PATENT DOCUMENTS

| | | | | |
|---|---|---|---|---|
| JP | 2005180362 A | * | 7/2005 | .............. F02B 39/16 |
| JP | 2006161734 A | * | 6/2006 | .............. F04C 18/16 |

(Continued)

OTHER PUBLICATIONS

Translation JP 2005180362.*

(Continued)

*Primary Examiner* — Thai Ba Trieu
*Assistant Examiner* — Jason T Newton
(74) *Attorney, Agent, or Firm* — Julia Voutyras; Alleman Hall McCoy Russell & Tuttle LLP

(57) ABSTRACT

A method for controlling a compressor of a turbocharger is disclosed. In one example, the method comprises varying a maximum permitted compressor outlet temperature based upon a function of compressor outlet temperature and operating time, and controlling the operation of the compressor so that the maximum permitted compressor outlet temperature is not exceeded. In this way a higher boost pressure can safely be used during the early life of the compressor but excessive coking of the compressor with a resultant loss of efficiency later in the life of the compressor is reduced.

18 Claims, 5 Drawing Sheets

(51) Int. Cl.
*F02B 39/16* (2006.01)
*F02D 41/00* (2006.01)
*F02D 9/02* (2006.01)
*F02D 41/14* (2006.01)

(56) References Cited

U.S. PATENT DOCUMENTS

2002/0069011 A1* 6/2002 Hawkins et al. .............. 701/104
2005/0193810 A1* 9/2005 Gladden .................... 73/119 R
2007/0227139 A1* 10/2007 Withrow et al. ................ 60/599
2011/0154821 A1* 6/2011 Evans-Beauchamp ......... 60/615

FOREIGN PATENT DOCUMENTS

JP    2006207467 A    8/2006
JP    2009168007 A    7/2009

OTHER PUBLICATIONS

Translation JP 2005180362, Dec. 7, 2013.*

* cited by examiner

METHOD FOR CONTROLLING THE OPERATION OF A COMPRESSOR

RELATED APPLICATIONS

The present application claims priority to United Kingdom Patent Application No. 1102342.1, filed on Feb. 10, 2011, the entire contents of which are hereby incorporated by reference for all purposes.

FIELD

This disclosure relates to a boosted engine system and in particular to a method for controlling a compressor forming part of such a system.

BACKGROUND AND SUMMARY

It is known to use an exhaust driven turbocharger or supercharger to improve the torque and emission performance of a diesel engine. For highly boosted diesel engines, both supercharged and turbocharged, the outlet temperature (Tcomp_out) of a compressor of such a booster is often the limiting factor in determining the maximum permitted boost level. There are a number of factors that determine the limit Tcomp_out, such as the material used to manufacture the intake manifold of the engine, but often the lowest of these factors is related to compressor coking caused by engine blow-by gases passing through the compressor at high temperatures. Coking progressively reduces compressor efficiency leading to higher intake temperatures, increased pumping losses and higher turbocharger speeds.

Therefore it is known that, in order to prevent such coking, the maximum permitted Tcomp_out and hence boost pressure and maximum power is restricted below a level that could be achieved and Tcomp_out is becoming the constraint on maximum power and torque deliverable by the engine.

For example, JP2005/180362 discloses a method and apparatus in which an electronic control unit performs a program including a step of detecting discharged air temperature TC, a step of judging whether or not the discharged air temperature TC is higher than a predetermined temperature TC(1) and a step of lowering the discharged air temperature TC by reducing supercharging pressure when the discharged air temperature TC is higher than the predetermined temperature TC(1). The predetermined temperature TC(1) is a temperature lower than a temperature at which coking occurs in the turbocharger.

It is a disadvantage of such a method of control that, for the majority of passenger car users, the proportion of time spent operating at conditions where the maximum permitted compressor outlet temperature is relevant is very small. This is because the maximum permitted compressor outlet temperature Tcomp_out_limit is typically only relevant when operating the engine close to the maximum rated power of the engine at warm ambient temperatures. Therefore for these users a fixed Tcomp_out_limit is an unnecessary restraint on the available performance of the engine.

The inventors have recognized the issues with the above approach and herein offer a method to at least partly address them. In one embodiment, a method for controlling operation of a compressor arranged to supply boosted air to an engine comprises varying a maximum permitted compressor outlet temperature based upon a function of compressor outlet temperature and operating time, and controlling the operation of the compressor so that the maximum permitted compressor outlet temperature is not exceeded.

In one example, the maximum permitted compressor outlet temperature may be based on the amount of time the compressor has been operated at various temperatures above a threshold. Thus, the temperature the compressor may operate at is not restricted solely on a preset maximum temperature but instead fluctuates throughout the life of the compressor, in order to maximize the time the compressor may spend at relatively high operating temperatures, thus maximizing boost pressure and increasing engine efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 1:
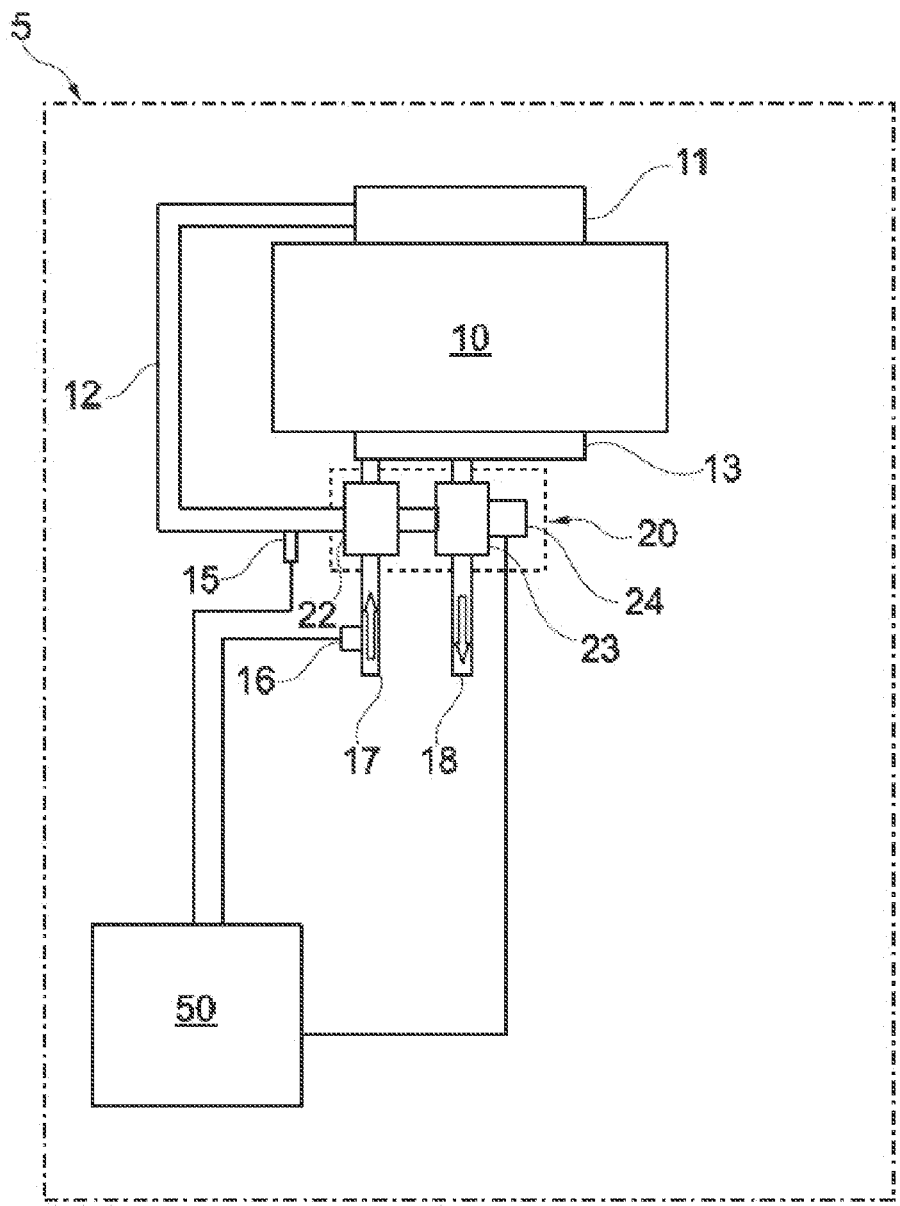
FIG. 1 is a block diagram of a boosted engine system according to one embodiment of the disclosure.

It is an object of the disclosure to provide a method to maximize the performance of a boosted engine. According to a first aspect of the disclosure a method is provided for controlling the operation of a compressor arranged to supply boosted air to an engine, wherein the method comprises varying a maximum permitted compressor outlet temperature based upon a function of compressor outlet temperature and operating time and controlling the operation of the compressor so that the maximum permitted compressor outlet temperature is not exceeded.

The function of compressor outlet temperature and operating time may be a total age factor indicative of an equivalent total operating time of the compressor at a predetermined compressor outlet temperature. Varying the maximum permitted compressor outlet temperature may comprise reducing the permitted maximum compressor outlet temperature.

The permitted maximum compressor outlet temperature may be reduced in accordance with a predetermined relationship between the total age factor and the permitted maximum compressor outlet temperature. The predetermined relationship may be maintaining the maximum compressor outlet temperature at a first higher temperature until the total age actor exceeds a predetermined value and then reducing the permitted maximum compressor outlet temperature to a lower temperature at which no further coking of the compressor will occur.

The transfer from the higher temperature to the lower temperature may be a gradual change or may be a step change in permitted maximum compressor outlet temperature. The method may further comprise repetitively determining for successive predetermined time periods discrete age factors based on the instantaneous outlet temperature of the compressor during the predetermined period of time. The compressor total age factor may be a summation of all of the discrete age factors of the compressor. Each discrete age factor may represent an equivalent operating time of the compressor at a predetermined compressor outlet temperature. Each discrete age factor may be based on a predetermined relationship between compressor outlet temperature and equivalent operating time.

According to a second aspect of the disclosure there is provided a boosted engine system comprising an internal combustion engine, a booster having a compressor to supply boosted air to the engine and an electronic control unit to control the operation of at least the booster wherein the electronic control unit varies a maximum permitted compressor outlet temperature based upon a function of compressor outlet temperature and operating time and controls the operation of the compressor so that the maximum permitted compressor outlet temperature is not exceeded.

The function of compressor outlet temperature and time may be a total age factor indicative of an equivalent total operating time of the compressor at a predetermined compressor outlet temperature. The electronic control unit may be further operable to repetitively determine for successive predetermined time periods discrete age factors based on the instantaneous outlet temperature of the compressor during the predetermined period of time. The compressor total age factor may be a summation of all of the discrete age factors of the compressor.

Each discrete age factor may represent an equivalent operating time of the compressor at a predetermined compressor outlet temperature based on a predetermined relationship between compressor outlet temperature and equivalent operating time. The predetermined relationship may be maintaining the maximum compressor outlet temperature at a first higher temperature until the total age actor exceeds a predetermined value and then reducing the permitted maximum compressor outlet temperature to a lower temperature at which no further coking of the compressor will occur.

The transfer from the higher temperature to the lower temperature may be a gradual change or may be a step change in permitted maximum compressor outlet temperature. The booster may be a turbocharger and the compressor may be a turbine driven compressor of the turbocharger. The electronic control unit may control the outlet temperature of the compressor by limiting the boost pressure produced by the compressor.

With reference to FIG. 1 there is shown a boosted internal combustion engine system 5 having an internal combustion engine which in this case is a diesel engine 10 (but could be another form of internal combustion engine), a booster in the form of a turbocharger 20, and an electronic control unit 50.

The engine 10 has an inlet manifold 11 arranged to receive a supply of boosted air from the turbocharger 20 via an intake system 12 and an outlet manifold 13 arranged to supply exhaust gas to the turbocharger 20.

The turbocharger 20 has a turbine 23 driven by the exhaust gases from the engine 10 and a compressor 22 driven by the turbine 23 and arranged to supply boosted air to the engine 10 via the intake system 12.

After passing through the turbine 23 the exhaust gas flows out to atmosphere via an exhaust system 18. Inlet gases enter the compressor 22 from an air inlet 17.

It will be appreciated that the engine system 5 as shown is much simplified and that in practice an intercooler will likely be included as part of the intake system 12 and that the air entering the air inlet will likely come from several sources including breather gases, fresh air and recirculated exhaust gas flow (EGR).

In the embodiment shown the electronic control unit 50 receives a signal indicative of the pressure in the intake system 12 from a pressure sensor 15 and a signal indicative of the temperature of the air entering the compressor 22 from a temperature sensor 16 located in the air inlet 17 and is operable to determine by using known relationships between inlet and outlet pressure and inlet and outlet temperature and compressor efficiency a predicted compressor outlet temperature from these signal inputs. However in other embodiments the outlet temperature of the compressor 22 could be measured directly using a temperature sensor located at the outlet from the compressor 22.

The electronic control unit 50 is operable to control the temperature of the gases exiting the compressor 22 by means of a turbine control actuator 24. The turbine control actuator 24 can be in the form of a wastegate valve control actuator or, in the case of a variable geometry turbocharger is a variable vane control actuator. In either case the turbine control actuator 24 controls the rotational speed of the turbine 23 which directly varies the rotational speed of the compressor 22 to which it is connected. In practice, the electronic control unit 50 controls the turbocharger 20 based upon a maximum permitted boost pressure P_boost_max but this is based upon a desired maximum or limiting value of compressor outlet temperature Tcomp_out_lim. The use of boost control simplifies the operation of the system because the electronic control unit 50 also controls the turbocharger 20 to meet driver demands and to do this boost pressure is controlled.

In simple terms the outlet temperature Tcomp_out is controlled so that it does not exceed a maximum permitted compressor outlet temperature limit Tcomp_out_lim and varies this limit based upon a temperature corrected factor indicative of running time or age of the compressor 22 required to maintain the efficiency of the compressor 22 above a predetermined efficiency for a predetermined running time of the compressor 22.

Figure 3:
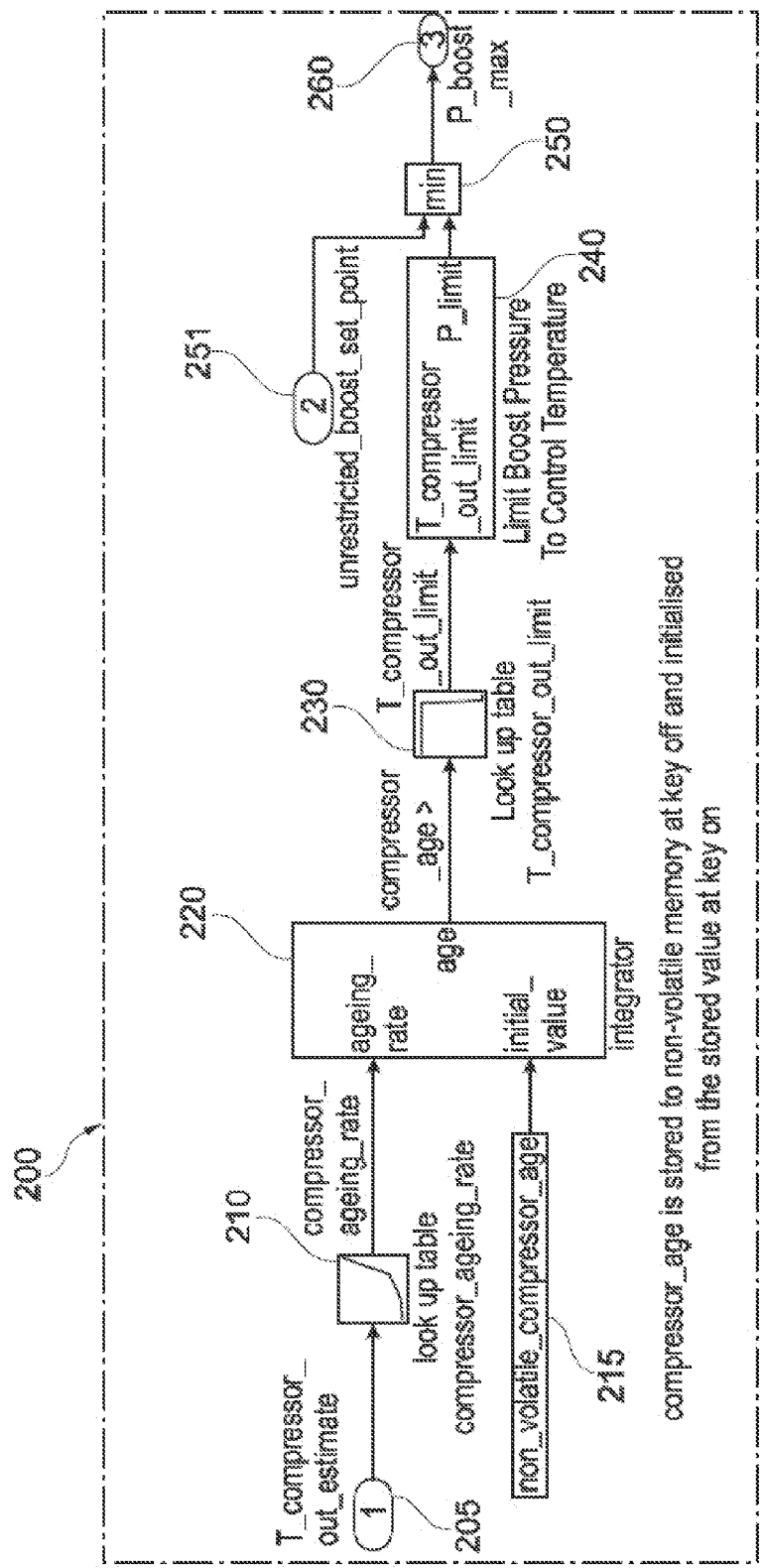
FIG. 3 is a schematic diagram of a control routine performed by an electronic control unit forming part of the engine system shown in FIG. 1.
Figure 4:
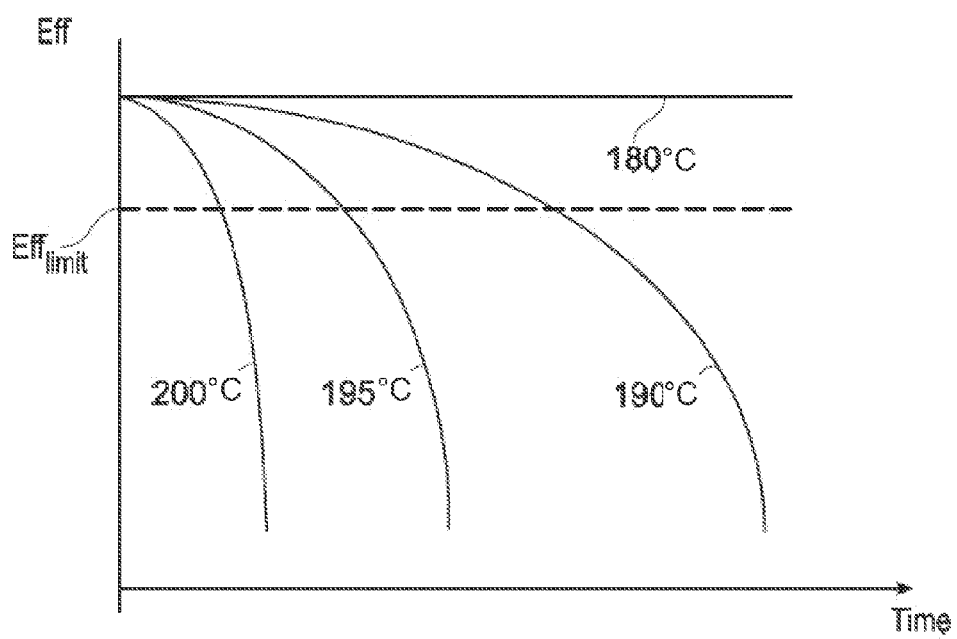
FIG. 4 is a chart showing the relationship between compressor outlet temperature, time and compressor efficiency.

Referring now to FIGS. 3 and 4 the operation of the engine system 5 will be described in greater detail.

FIG. 4 shows the relationship between compressor efficiency and time for four operating temperatures, 200, 195, 190 and 180° C., produced by experimental work.

From the chart it can be seen that the time required for the compressor efficiency (Eff) to fall to a minimum acceptable efficiency limit Efflimit varies significantly depending upon the temperature of the gases exiting the compressor 22. This is due to the effect of compressor coking which reduces the efficiency of a compressor 22 over time and this coking is related to the temperature of the gases exiting the compressor 22 because coking is essentially temperature-produced oxidation of the hydrocarbons (oil) in the air flowing through the compressor 22.

If the compressor were to be run such that the outlet temperature does not exceed 180° C. then there would in the example shown be no loss of efficiency over time and the compressor 22 could theoretically be run indefinitely without suffering any loss of efficiency. However, as a 10° C. reduction in Tcomp_out would give a reduction in available boost of around 7% at typical conditions, a considerable loss of engine performance would result if the compressor outlet temperature is restricted to such a low level.

Conversely, in the case of a compressor operating continuously at 200° C. the efficiency very rapidly drops off and the life of the compressor before the efficiency deteriorates to an unacceptable level would be very limited.

Therefore from such test work a relationship between temperature and time can be derived so that equivalent aging rates can be produced as set out by way of example and without limitation below in Table 1.

TABLE 1

| Tcomp_out [° C.] | Real Time to max tolerable efficiency loss (hrs) | Ageing Rate [hr/hr] |
|---|---|---|
| 180 | Never | 0 |
| 185 | 200 | 0.3 |
| 190 | 60 | 1 |
| 195 | 20 | 3 |
| 200 | 5 | 12 |

From Table 1 it can be seen that if the outlet temperature is 200° C., the rate of loss is twelve times faster than if the temperature is 190° C., and forty times greater than if the temperature is 185° C.

Therefore from this data an equivalent operating life of the compressor 22 can be derived based upon a predetermined temperature of 190° C. For example, if the compressor outlet temperature during a 60 second period is 190° C. for 40 seconds, 195° C. for 15 seconds, and 200° C. for 5 seconds the equivalent life for this discrete period of time using the 190° C. as the basis would be 40+(15*3)+(5*12)=145 seconds. The figure of 145 seconds represents the discrete age factor (DAF) for the measured period.

By adding all of the discrete age factor (DAF) values together since the compressor was first used, a value for the total age factor (TAF) of the compressor 22 can be determined. This TAF is then used to control the compressor outlet temperature as described in greater detail hereinafter.

Referring now to FIG. 3, a flow diagram 200 depicts a control routine as performed by the electronic control unit 50.

At 205 the receipt of an estimated value of the current compressor outlet temperature (T_compressor_out_estimate) is received. At 210 this value of estimate compressor outlet temperature is used in conjunction with a look up table to produce a discrete value of age factor (DAF) which is forwarded to an integrator 220 where it is combined with a pre-existing value for the total age factor (TAF) of the compressor 22 from a non-volatile memory 215. The output from the integrator 220 is a value for the temperature-corrected total age of the compressor 22. That is to say, a new value of TAF (TAFnew) is output. The value of TAFnew is used in conjunction with a lookup table 230 referencing TAF against allowable compressor output temperature limit Tcomp_out_lim and this value is input to a turbocharger boost control device 240 so as to produce a boost pressure limit P_limit based upon Tcomp_out_lim. The value of P_limit is output from 240 to a processing device 250 which also receives a value of unrestricted boost pressure (unrestricted_boost_set_point) from a set point device 251. The unrestricted boost pressure is the value of boost that the electronic control unit 50 would like to set based upon a torque demand from an operator of the engine 10. The processing device 250 combines the two inputs it receives and produces a command signal 260 (P_boost_max) used to control the operation of the turbine control actuator 24 so as to produce the required level of boost. That is to say, if unrestricted_boost_set_point is greater than P_limit the value of P_limit is output as P_boost_max at 260 but if the value of unrestricted_boost_set_point is less than P_limit then the unrestricted_boost_set_point is output as P_boost_max at 260.

The look up table 230 may include a control function or predetermined relationship such as that set out in Table 2 below or may be a continuously changing relationship from a maximum or higher temperature such as 195° C. down to a lower temperature where no further coking will occur, such as 180° C., at some predetermined number of hours after first use of the compressor and then will then remain at the non-coking level (180° C.) thereafter.

The predetermined relationship in this case maintains the maximum compressor outlet temperature at the first higher temperature 195° C. until the total age actor exceeds a predetermined value which in this case is 59 hours, and then reduces the permitted maximum compressor outlet temperature to the lower temperature 180° C. at which no further coking of the compressor will occur.

The transfer from the higher temperature to the lower temperature may be a gradual change or may be a step change in permitted maximum compressor outlet temperature.

TABLE 2

| TAF Compressor Age [hr] | Tcomp_out_lim [° C.] |
|---|---|
| 0 | 195 |
| 59 | 195 |
| 60 | 180 |
| 1000 | 180 |

Therefore by using such an approach a relatively high compressor outlet temperature can be permitted, particularly during the early life of the compressor 22, provided that the effect of such a high compressor outlet temperature on loss of compressor efficiency is allowed for when determining the true state of the compressor 22.

In Table 2 the compressor efficiency limit Efflimit is reached when the compressor has operated at 195° C. for 59 hours. After 59 hours the compressor outlet temperature is set to 180° C. which will produce no further loss of compressor efficiency. Therefore in this case the predetermined temperature is 195° C. and the DAF and TAF will be based on this temperature. For example, if the engine was run continuously at 190° C. then it could (from Table 1) be actually run for 59 real hours before the outlet temperature of the compressor is reduced to 180° C.

It will be appreciated that other temperatures could be used and that the disclosure is not limited to the use of 195° C. for the predetermined temperature.

With previous control methods the compressor outlet temperature has to be restricted to prevent premature loss of compressor efficiency and so a low outlet temperature of perhaps 180° C. is used where no appreciable coking will occur. But, because a 10° C. increase in Tcomp_out gives an increase in available boost of around 7% at typical conditions, significant performance benefits can be obtained without compromising durability by varying the permitted compressor outlet temperature in accordance with this disclosure. These performance benefits will be available for the majority of the life of the vehicle for a high proportion of customers because the high temperatures that result in high a DAF rarely occur.

Although the disclosure has been described above as applied to a turbocharger it will be appreciated that a similar approach could be used to provide a total age factor for a compressor of a supercharger.

Figure 2:
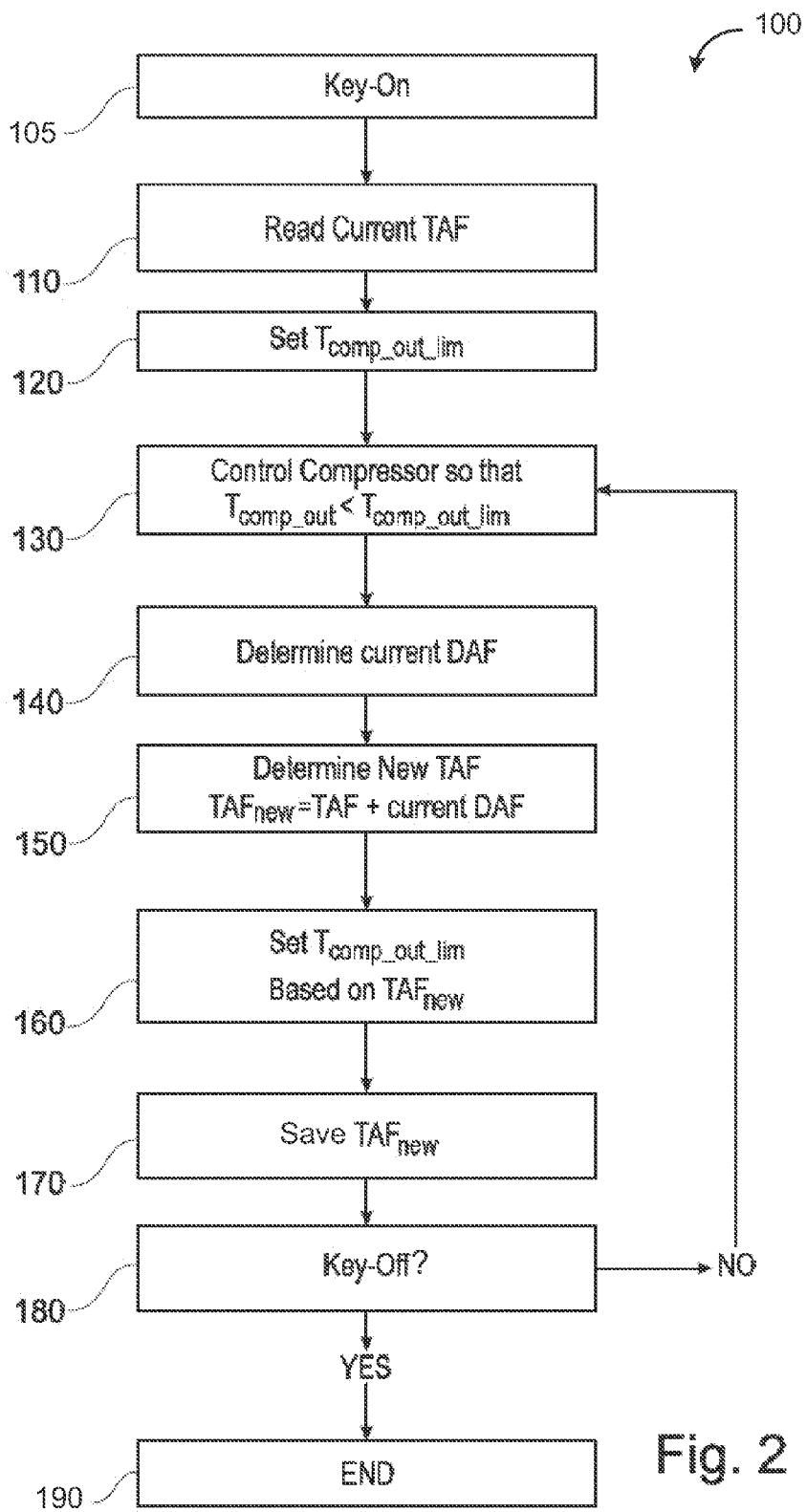
FIG. 2 is a simplified flow chart of a method for controlling a booster according to an embodiment of the disclosure.

Referring now to FIG. 2 there is shown in a high level form a method 100 according to one aspect of the disclosure as applied to a boosted engine of a motor vehicle. The method commences at 105 when a starter switch or ignition key is moved to an on position. At 110 a current value for the total age factor (TAF) is read from a non-volatile memory located on the motor vehicle in, for example, the electronic control unit 50.

The method advances to 120 where a maximum permitted compressor outlet temperature limit Tcomp_out_lim is set based upon the current TAF, and the method advances to 130 where the compressor 22 is controlled so that its outlet temperature does not exceed limit Tcomp_out_lim. The control of temperature is, in the case of a turbocharger, achieved by varying the speed of the compressor 22 by adjusting the speed of the turbine 23 to which the compressor 22 is drivingly attached to produce a particular value of boost pressure.

The method advances to 140 where the current discrete age factor (DAF) is determined. This is determined as discussed above by the use of a look up table referencing temperature and DAF for a discrete period of time. For example, every 100 milliseconds this calculation may be performed so that a new value of DAF is produced every 0.1 seconds.

The current discrete age factor DAF is then added to the current value for the total age factor TAF at 150 to produce an updated value of TAFnew. TAFnew is then used at 160 to determine a new value for the compressor outlet temperature limit Tcomp_out_lim and this is saved in the non-volatile memory at 170, and assuming there is not a key-off event, the updated value of Tcomp_out_lim is fed back to 130, and 130 to 180 are then continuously repeated until a key-off event occurs, at which point the method branches at 180 to 190, where it ends.

It will be appreciated that the above is provided by way of example and that the method is not limited to the precise steps described or to the specific order of processing. For example, 130 and 140 could be performed concurrently and not sequentially.

Figure 5:
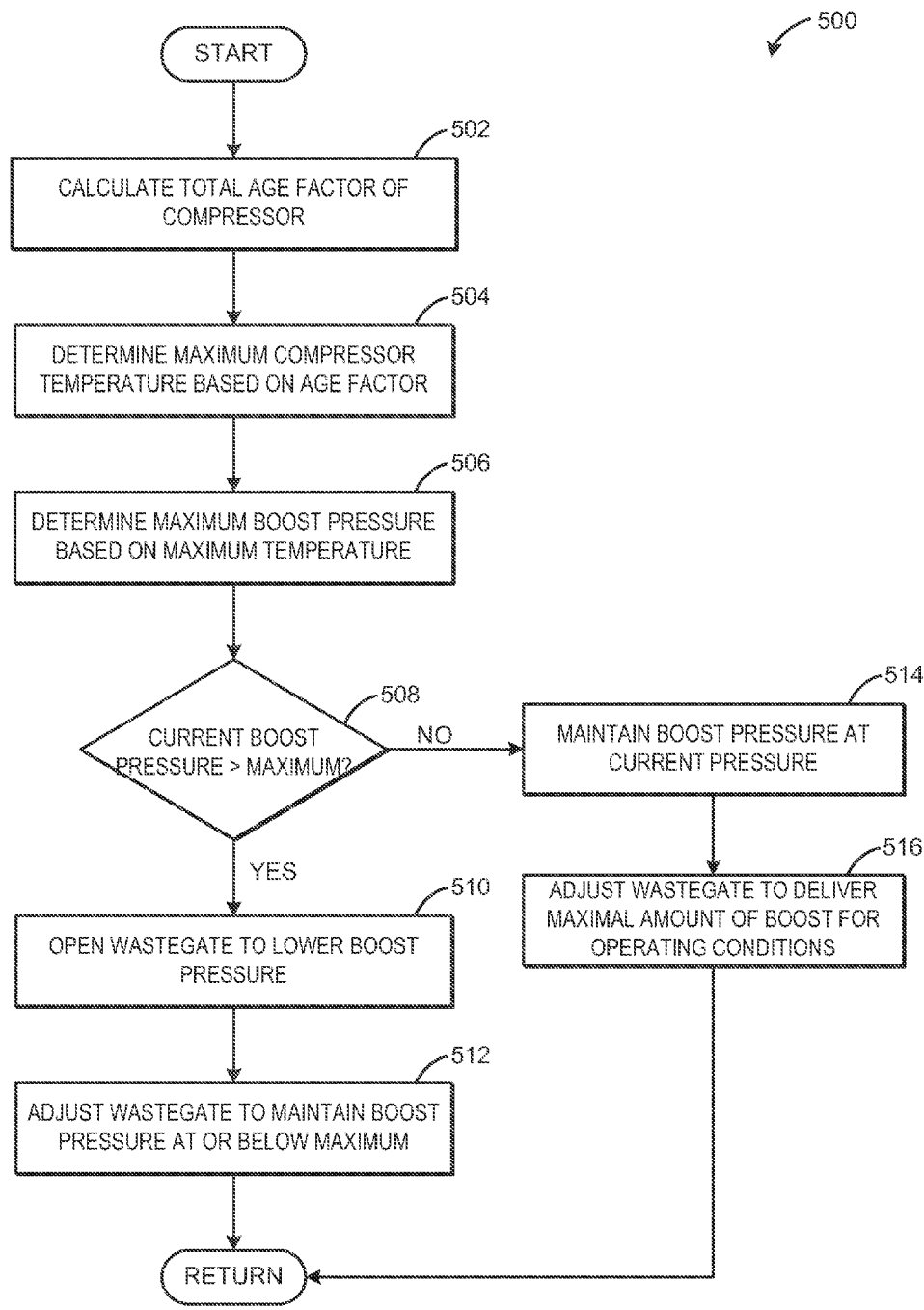
FIG. 5 is a flow chart illustrating a method for controlling a turbocharger according to an embodiment of the present disclosure.

FIG. 5 is a flow chart illustrating a method 500 for controlling a turbocharger according to an embodiment of the present disclosure. Method 500 may be carried out according to instructions stored in the memory of an engine controller, such as electronic control unit 50. Method 500 comprises, at 502, calculating a total age factor of a compressor of the turbocharger. The total age factor may be a weighted average of the amount of time the compressor has been operated at all temperatures above a particular threshold. The threshold may be a threshold temperature above which compressor coking may occur, such as above 180° C. The total age factor may be calculated according to the method described above with respect to FIG. 3.

At 504, a maximum allowable compressor temperature may be determined based on the determined age factor of the compressor. As explained with respect to FIGS. 2 and 3, the maximum compressor temperature may be determined based on a look up table stored in the memory of the controller, and may be determined based on a model determined off-line. The maximum compressor temperature may decrease as the age factor of the compressor increases in order to reduce compressor operation at high temperatures as the compressor ages. At 506, a maximum boost pressure that the compressor may operate is determined based on the maximum compressor temperature. The maximum boost pressure may also be determined from a look up table stored in the memory of the controller.

At 508, it is determined if the current boost pressure of the intake air as it exits the compressor is above the maximum boost pressure determined at 506. If the boost pressure exceeds the maximum, method 500 proceeds to 510 to open a wastegate of the turbocharger to lower the boost pressure. At 512, the wastegate may be continually adjusted in order to maintain boost pressure at or below the maximum boost pressure.

If the current boost pressure does not exceed the maximum at 508, method 500 proceeds to 514 to maintain current boost pressure at the current pressure. Further, at 516, the wastegate may be adjusted so the turbocharger delivers a maximal amount of boost for the current operating conditions. As explained previously, a maximal amount of boost may be based on an operator torque request. This maximal amount of boost may be unrestricted, e.g., it may be the highest amount of boost permissible without delivering additional torque without restrictions from outside parameters, such as the age of the compressor. After adjusting the wastegate at 512 or 516, method 500 returns.

Thus, method 500 of FIG. 5 provides for controlling a wastegate to limit boost if indicated by the age of the compressor. In this way, the boost may be limited to reduce compressor issues due to coking (which may occur at high compressor temperatures) while allowing maximal boost when the compressor has not aged significantly, e.g., when the age factor of the compressor is below a threshold. In this way, the compressor may be operated at high temperatures during an early stage of the compressor's lifespan in order to maximize time spent at high boost pressures, which can increase engine efficiency. Then, once the compressor has been operated at these high temperatures for a threshold amount of time, the maximum boost at which the compressor is operated may be lowered to reduce compressor issues due to accumulated coking.

While in the depicted embodiment the wastegate is controlled to control boost pressure, other mechanisms may be controlled, such as opening or closing a compressor bypass valve, diverting exhaust upstream of the turbine of the turbocharger to the intake (otherwise referred to as high pressure EGR), etc., in order to limit boost.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling operation of a compressor arranged to supply boosted air to an engine, comprising:
    varying a maximum permitted compressor outlet temperature based upon a function of compressor outlet temperature and compressor operating time to generate a varied maximum permitted compressor outlet temperature; and controlling the operation of the compressor via a wastegate in response to the varied maximum permitted compressor outlet temperature so that the maximum permitted compressor outlet temperature is not exceeded.

2. The method as claimed in claim 1, wherein the function of compressor outlet temperature and compressor operating time is a total age factor representative of an equivalent total operating time of the compressor at a predetermined compressor outlet temperature.

3. The method as claimed in claim 2, wherein varying the maximum permitted compressor outlet temperature comprises reducing the maximum permitted compressor outlet temperature from a previously determined maximum permitted compressor outlet temperature.

4. The method as claimed in claim 3, wherein the maximum permitted compressor outlet temperature is reduced in accordance with a predetermined relationship between the total age factor and the maximum permitted compressor outlet temperature.

5. The method as claimed in claim 2, further comprising repetitively determining for successive predetermined time periods discrete age factors based on an instantaneous outlet temperature of the compressor during a respective predetermined period of time.

6. The method as claimed in claim 5, wherein the compressor total age factor is a summation of all of the discrete age factors of the compressor.

7. The method as claimed in claim 5, wherein each discrete age factor represents an equivalent operating time of the compressor at the predetermined compressor outlet temperature.

8. The method as claimed in claim 7, wherein each discrete age factor is based on a predetermined relationship between compressor outlet temperature and equivalent operating time.

9. A boosted engine system, comprising:
    an internal combustion engine;
    a booster having a compressor to supply boosted air to the engine; and
    an electronic control unit including non-transitory instructions stored in memory to control operation of at least the booster, wherein the electronic control unit includes instructions to vary a maximum permitted compressor outlet temperature based upon a function of compressor outlet temperature and operating time to generate a varied maximum permitted compressor outlet temperature and adjust an amount of boost pressure via a wastegate produced by the compressor in response to the varied maximum permitted compressor outlet temperature so that the maximum permitted compressor outlet temperature is not exceeded.

10. The system as claimed in claim 9, wherein the function of compressor outlet temperature and operating time is a total age factor representative of an equivalent total operating time of the compressor at a predetermined compressor outlet temperature.

11. The system as claimed in claim 10, wherein the electronic control unit is further operable to repetitively determine for successive predetermined time periods discrete age factors based on an instantaneous outlet temperature of the compressor during a respective predetermined period of time.

12. The system as claimed in claim 11, wherein the compressor total age factor is a summation of all of the discrete age factors of the compressor.

13. The system as claimed in claim 11, wherein each discrete age factor represents an equivalent operating time of the compressor at the predetermined compressor outlet temperature based on a predetermined relationship between compressor outlet temperature and equivalent operating time.

14. The system as claimed in claim 9, wherein the booster is a turbocharger and the compressor is a turbine driven compressor of the turbocharger.

15. The system as claimed in claim 9, wherein the electronic control unit controls the outlet temperature of the compressor by limiting boost pressure produced by the compressor.

16. A method, comprising:
    responsive to an operator torque request that results in a boost pressure that raises a temperature of a compressor above a maximum compressor temperature, opening, via an actuator controlled according to instructions stored in memory of an electronic control unit, a wastegate to reduce boost pressure, the maximum compressor temperature set based on a determined age factor of the compressor, the determined age factor a function of an amount of time the compressor operates at temperatures above a threshold.

17. The method of claim 16, wherein the maximum compressor temperature lowers as the determined age factor increases.

18. The method of claim 16, further comprising, when the determined age factor is below a lower limit, adjusting the wastegate to deliver a maximal amount of boost pressure for current engine operating parameters.

* * * * *